United States Patent
Nimmer et al.

(10) Patent No.: US 11,892,889 B2
(45) Date of Patent: Feb. 6, 2024

(54) NETWORK SWITCH DEVICE WITH BATTERY POWERED BACK-UP MODEM AND REMOTE DEVICE POWER SUPPLY

(71) Applicant: Metropolitan Industries, Inc., Romeoville, IL (US)

(72) Inventors: James Andrew Nimmer, Minooka, IL (US); John R. Kochan, Jr., Naperville, IL (US)

(73) Assignee: Metropolitan Industries, Inc., Romeoville, IL (US)

( * ) Notice: Subject to any disclaimer, the term of this patent is extended or adjusted under 35 U.S.C. 154(b) by 0 days.

(21) Appl. No.: 17/739,948

(22) Filed: May 9, 2022

(65) Prior Publication Data
US 2022/0360460 A1 Nov. 10, 2022

Related U.S. Application Data

(60) Provisional application No. 63/185,738, filed on May 7, 2021.

(51) Int. Cl.
| | |
|---|---|
| *G06F 1/30* | (2006.01) |
| *G06F 1/26* | (2006.01) |
| *H04L 12/10* | (2006.01) |
| *H04W 76/10* | (2018.01) |

(52) U.S. Cl.
CPC ................ *G06F 1/30* (2013.01); *G06F 1/263* (2013.01); *H04L 12/10* (2013.01); *H04W 76/10* (2018.02)

(58) Field of Classification Search
CPC ........... G06F 1/263; G06F 1/30; H04W 76/10
USPC ....................................................... 713/340
See application file for complete search history.

(56) References Cited

U.S. PATENT DOCUMENTS

| | | | | |
|---|---|---|---|---|
| 5,768,310 | A * | 6/1998 | Huloux | H04L 12/4135 375/377 |
| 6,651,190 | B1 * | 11/2003 | Worley | G06F 11/0709 709/224 |
| 9,986,509 | B1 * | 5/2018 | Diwane | H04W 4/12 |
| 2008/0018427 | A1 * | 1/2008 | Ezra | H04L 1/22 340/7.32 |
| 2010/0180139 | A1 * | 7/2010 | Denney | H04N 21/4436 725/111 |
| 2011/0116459 | A1 * | 5/2011 | Lee | H04W 88/04 375/222 |
| 2013/0267224 | A1 * | 10/2013 | Krishnaswamy | H04W 36/14 455/426.1 |

(Continued)

FOREIGN PATENT DOCUMENTS

| | | | | |
|---|---|---|---|---|
| CN | 108377303 B | * | 5/2020 | H04L 12/10 |

*Primary Examiner* — Chun Cao
(74) *Attorney, Agent, or Firm* — Levenfeld Pearlstein, LLC

(57) ABSTRACT

The present disclosure relates to a device for network switching. The device includes an uninterrupted power supply (UPS) configured to provide electrical power from a power grid to a battery and a modem. The device further includes the battery configured to provide electrical power to a cellular modem. The device also includes the cellular modem configured to provide internet connection to a remote device. The device in addition includes a network switch configured to switch internet connectivity between the modem and the cellular modem. The network switch, when the power grid is interrupted, switches from the modem to the cellular modem to provide internet connectivity to the remote device.

20 Claims, 5 Drawing Sheets

(56) References Cited

U.S. PATENT DOCUMENTS

2014/0038672 A1* 2/2014 Yang .................... H04W 88/06
                                                    455/558
2022/0148397 A1* 5/2022 Schoeman .......... H04L 12/2823

* cited by examiner

NETWORK SWITCH DEVICE WITH BATTERY POWERED BACK-UP MODEM AND REMOTE DEVICE POWER SUPPLY

CROSS-REFERENCE TO RELATED APPLICATION

This application is based upon and claims priority to U.S. Provisional Application No. 63/185,738 filed on May 7, 2021, the entire contents thereof are incorporated herein by reference in their entireties for all purposes.

BACKGROUND

During power outages, access to the internet and network connectivity can become problematic if the modem is not powered by an uninterruptible power supply (UPS) or back-up battery. Loss of service from the provider can also occur during an outage which can cause a battery-powered modem to become inoperable. A cellular modem with a backup battery can be employed in applications that require constant connectivity even during power outages, however this solution can be expensive if excessive amounts of data are used. Remote devices that require connectivity would also need to be powered by a UPS or battery which increases the cost and amount of equipment needed.

Accordingly, there is a need for a device that can provide network connectivity and internet access through a grid-powered modem when grid power is present and switch to a battery-powered cellular modem during a power outage. There is further a need for such a device to have the capability to provide power to remote devices.

BRIEF SUMMARY

Examples of the present disclosure provide a device and methods for network switching.

According to a first aspect of the present disclosure, a device for network switching is provided. The device may include an uninterrupted power supply (UPS) configured to provide electrical power from a power grid to a battery and a modem. The device may further include the battery configured to provide electrical power to a cellular modem. The device may also include the cellular modem configured to provide internet connection to a remote device. The device in addition may include a network switch configured to switch internet connectivity between the modem and the cellular modem. The network switch, when the power grid is interrupted, may switch from the modem to the cellular modem to provide internet connectivity to the remote device.

According to a second aspect of the present disclosure, a method for network switching is provided. The method may be applied to a computing device. The computing device may provide a network connection to a remote device using a modem connected to a power grid. The computing device may also determine that the network connection provided by the modem is interrupted. The computing device may further switch the network connection of the remote device from the modem to a cellular modem.

According to a third aspect of the present disclosure, a computing device is provided. The computing device may include one or more processors, a non-transitory computer-readable memory storing instructions executable by the one or more processors. The one or more processors may be configured to provide a network connection to a remote device using a modem connected to a power grid. The one or more processors may further be configured to determine that the network connection provided by the modem is interrupted. The one or more processors may also be configured to switch the network connection of the remote device from the modem to a cellular modem.

The foregoing general description and the following detailed description are examples only and are not restrictive of the present disclosure.

BRIEF DESCRIPTION OF THE DRAWINGS

The benefits and advantages of the present embodiments will become more readily apparent to those of ordinary skill in the relevant art after reviewing the following detailed description and accompanying drawings, wherein.

DETAILED DESCRIPTION

Figure 1:
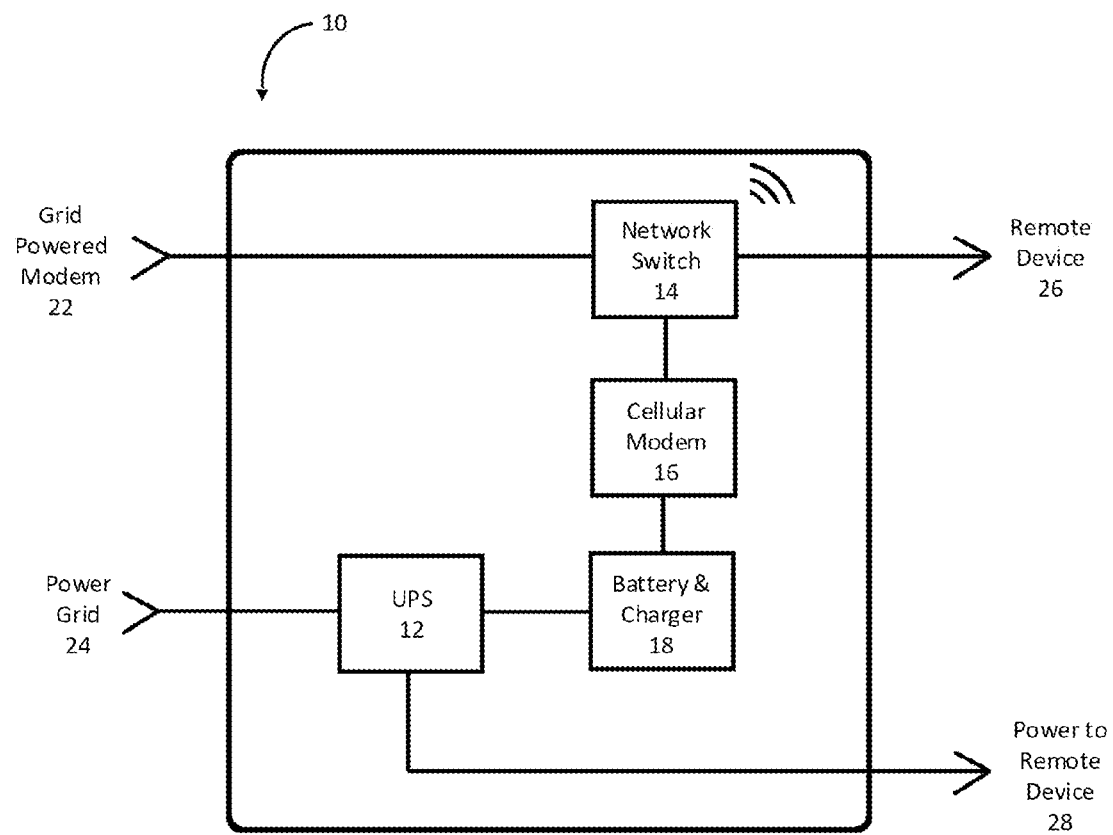
FIG. 1 is an illustration of a network and power device according to an embodiment.

While the present disclosure is susceptible of embodiment in various forms, there is shown in the drawings and will hereinafter be described presently preferred embodiments with the understanding that the present disclosure is to be considered an exemplification and is not intended to limit the disclosure to the specific embodiments illustrated. The words "a" or "an" are to be taken to include both the singular and the plural. Conversely, any reference to plural items shall, where appropriate, include the singular.

The present disclosure relates to a device for providing consistent access to a network or internet. The device may include a network switch (that can switch between wired, wireless, or combination thereof modems), a cellular modem with a backup battery, a battery charger, power loss detection, and a power supply or uninterrupted power supply (UPS) to provide power to remote devices.

According to one or more embodiments, when electrical grid power is present, the network switch can route network traffic between remote electronic devices and a grid-powered modem, and the cellular modem can be an idle state. In such condition, the grid power can be used to maintain a charge on the battery and can provide power to remote devices according to certain embodiments. When a power outage or power loss occurs, the network switch can reroute network traffic between remote device(s) and the cellular modem, power can be provided to the cellular modem by the battery through the UPS or power supply, and in some applications can provide power to remote devices.

FIG. 1 shows an exemplary device 10 according to embodiments presented herein. The device 10 may be a networking and power device. Specifically, FIG. 1 shows device 10 that may include an uninterrupted power supply (UPS) 12, network switch 14, cellular modem 16, and battery & charger 18. The device 10 may have a grid powered modem input 22, a power grid 24 input, a remote device 26 output, and a power to remote device 28 output. The device 10 may include a computing device, for example, as show in FIG. 7, that controls the network switching (the computing device may be within the network switch).

The UPS 12 may be a power supply that inputs electrical power from a power grid 24 and converts power to the required voltage and current levels. The UPS 12 can provide power to the battery & charger 18 and to the remote device 28. The network switch 14 may be a switching hub, bridging hub, MAC bridge, or other networking hardware that connects devices to a network. The network switch 14 can switch connections between the grid powered modem 22 and the cellular modem 16. The network switch 14 may also determine if the grid powered modem 22 is offline and may switch networks based off that determination. The cellular modem 16 may be a mobile broadband modem that allows a computing device or remote device 16 to receive wireless internet access via a mobile broadband connection. The cellular modem 16 may be connected to a mobile network. The battery & charger 18 may be fully charged while the UPS 12 is providing electrical power and may provide electrical power to the cellular modem 16 when the UPS 12 is offline.

The grid powered modem 22 input can be a modem connected to the electrical grid enabled to transmit data. The grid powered modem 22 may be a modem connected to the internet using telephone, cable television or internet broadband lines. The remote device 26 may be any electronic device, such as for example, a computer or computer server, a sump pump or water pump, a pump controller, any industrial commercial or residential appliance, or other electronic devices, equipment or machinery utilized in connection with a control system. As one example, utilization of embodiments presented herein can be particularly useful in connection with a sump pump that may lose power from the grid during extreme weather events and therefore may need emergency power to operate and communicate with a user to avoid flooding. The remote device 26 may further include critical equipment, like medical equipment, or Internet of Things (IoT) devices that require a constant connection to a network or internet.

Figure 2:
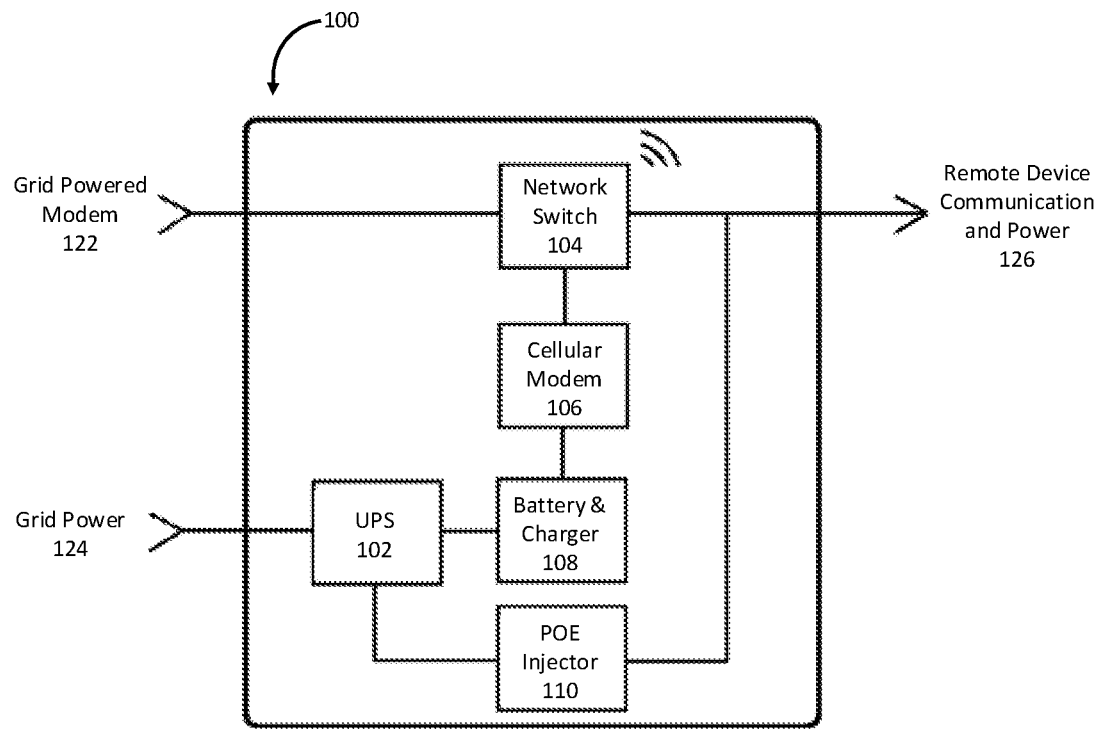
FIG. 2 is an illustration of a network and power device according to an embodiment.

FIG. 2 shows a device 100 according to exemplary embodiments shown schematically therein. As shown representatively in FIG. 2, device 100 can have a UPS 102, network switch 104, cellular modem 106, battery & charger 108, input from grid powered modem 122, and input from grid power 124. The device 100 may further include a power over ethernet (POE) injector 110 that supplies electrical power to the remote device using an ethernet cable. The device 100 may provide communication and power through the ethernet cable as an output 126 to the remote device.

Figure 3:
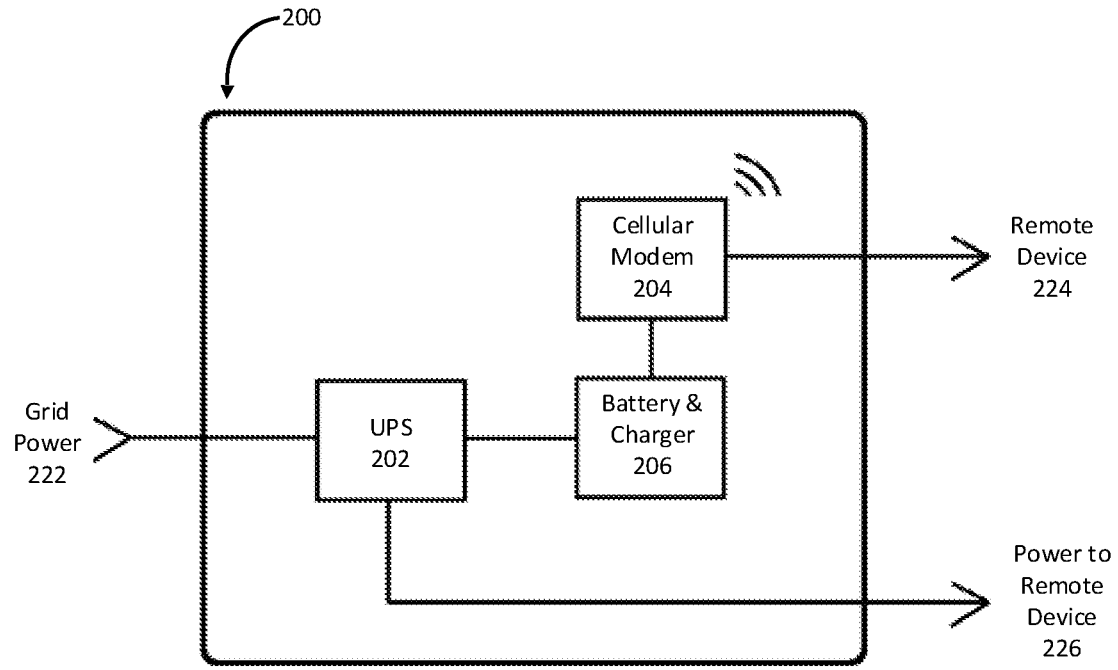
FIG. 3 is an illustration of a network and power device according to an embodiment.

FIG. 3 shows a device 200 according to exemplary embodiments shown schematically therein. As shown representatively in FIG. 3, device 200 can have a UPS 202, cellular modem 204, battery & charger 206, input from power 222, and output power to remote device 226. The remote device 224 may connect to a network or internet through cellular modem 204. The device 200 may detect when the UPS 202 is offline and may report to a user through the cellular modem 204 using the battery 206 as power.

Figure 4:
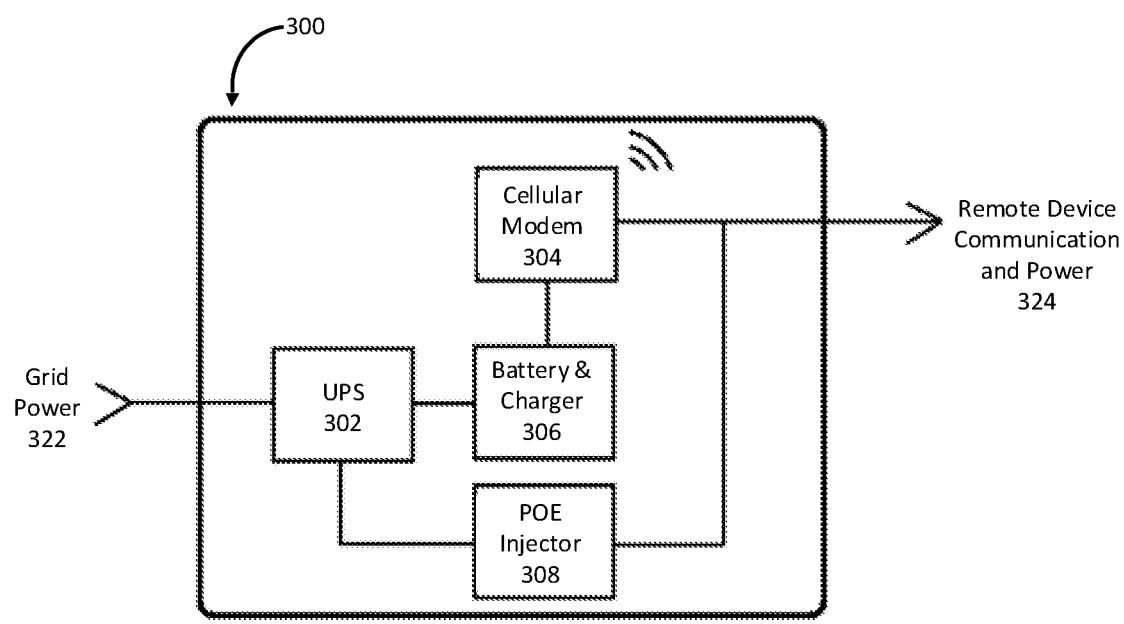
FIG. 4 is an illustration of a network and power device according to an embodiment.

FIG. 4 shows a device 300 according to exemplary embodiments shown schematically therein. As shown representatively in FIG. 4, device 300 can have a UPS 302, cellular modem 304, battery & charger 306, and input from power 322. The remote device 324 may connect to a network or internet through cellular modem 304 and may be powered through an ethernet cable connected to the cellular modem 304 and POE injector 308. For example, the ethernet cable may supply power to the remote device when the grid power 322 is on and may switch to supplying power from the battery through the cellular modem 304 when the grid power 322 is off. The power switch within the ethernet cable may be done using a power switch.

Figure 5:
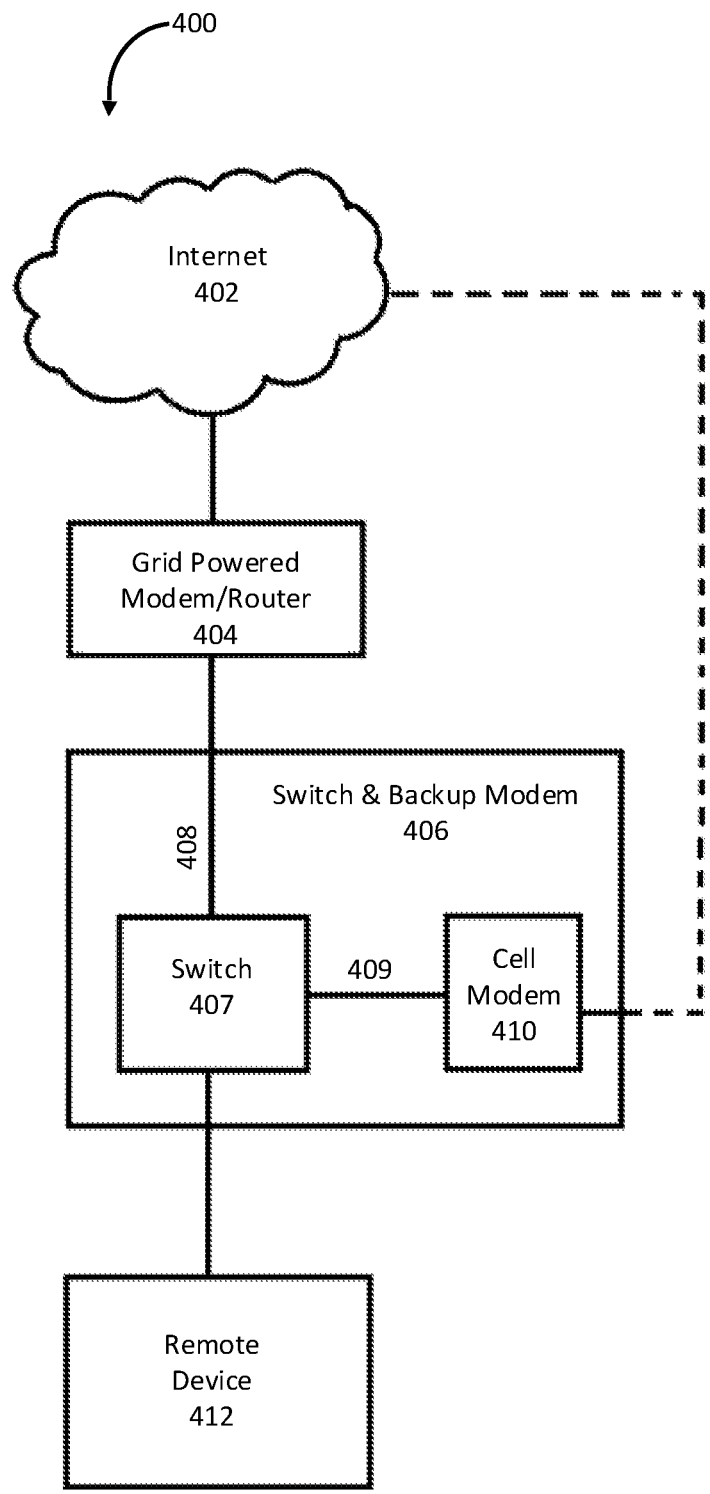
FIG. 5 is an illustration of a network and power device according to an embodiment.

FIG. 5 shows a network 400 according to exemplary embodiments presented herein. The network 400 may include a internet connection 402, grid powered modem/router 404, switch & backup modem 406 with switch 407, and cell modem 410, and a remote device 412. The switch 407 may have a default gateway output 408 and backup gateway output 409.

Figure 7:
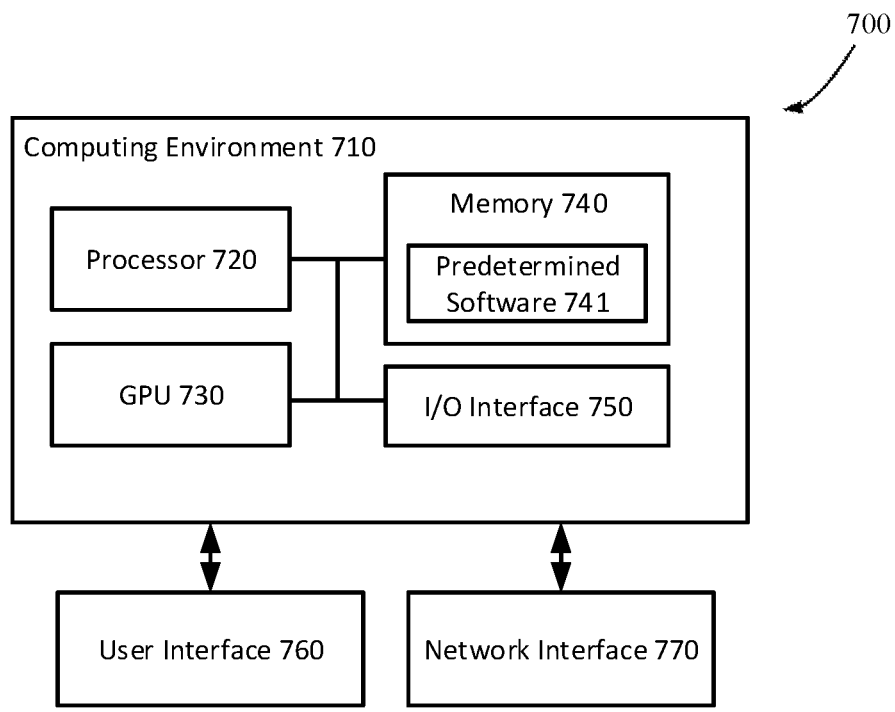
FIG. 7 is a diagram illustrating a computing environment according to an embodiment.

According to exemplary embodiments shown representatively in FIG. 5, the remote device 412 may connect to the internet 402 through the switch 407 and either the grid powered modem/router 404 or cell modem 410. The switch 407 may connect the remote device 412 to the grid powered modem/router 404 through the default gateway output 408 when the grid power is online and powering the modem 404. The switch 407 may connect the remote device 412 to the cell modem 410 through the backup gateway output 409 when the grid power is offline and there is no power to the modem 404. A computing device, for example, as shown in FIG. 7, may monitor when the power grid is down or when the modem 404 is offline and control switch 407 to switch between modem 404 and cell modem 410. The switch 407, in another example, itself can determine when the modem 404 is offline and switch to cell modem 410.

In one or more embodiments, for applications where the remote device contains a battery or is powered by an external source, such as an external UPS, power can be restricted from being provided to the remote device.

In one or more embodiments, communication between the remote device, network switch, and grid powered modem can use wireless communication.

In one or more embodiments, the communication between the remote device, network switch, and grid powered modem can use wired communication.

In one or more embodiments, the communication between the remote device, network switch, and grid powered modem can use a combination of wired and wireless communication.

In one or more embodiments, where connection to a grid powered modem is not available, the device may not contain a network switch. In this application, internet access and network connectivity are provided only by the cellular modem.

In one or more embodiments, where the device does not contain a network switch, the communication between the remote device and cellular modem can use wireless communication.

In one or more embodiments, where the device does not contain a network switch, the communication between the remote device and cellular modem can use wired communication.

In one or more embodiments, where the device does not contain a network switch, the communication between the remote device and cellular modem can use a combination of wired and wireless communication.

METHOD OF OPERATION

In one or more embodiments, the power loss detection circuitry can continuously monitor the state of the grid power. This circuitry can provide a signal to the network switch circuitry, which can determine the communication state. When grid power is present, the power loss detection circuitry can provide a signal to the network switch circuitry and the network switch circuitry can remain in or switch to a default communication state. When grid power is not present, the power loss detection circuitry can provide a signal to the network switch circuitry which is different from the signal provided when grid power is present. Under such conditions, the network switch circuitry can remain in or switch to a back-up communication state. Embodiments presented herein can further enable the device to switch to or from the default and back-up communication states based upon other conditions beyond the signal provided by the power loss circuitry. For example, the switching capability of the device can be based upon a detection of a loss of communication between the remote device and internet and/or private network.

FIG. 5 shows exemplary paths in which network traffic can be routed. As shown schematically in FIG. 5, in the default communication state, the switch can route traffic to and from the remote device(s) and internet and/or private network through the default gateway or router, (for example: gateway address 192.168.1.1). FIG. 5 additionally shows that in a back-up communication state, the switch can route traffic to and from the remote device(s) and internet and/or private network through the back-up gateway or router, (for example: gateway address 192.168.1.2).

In a variation of the above-mentioned method, the remote device can store a statically assigned back-up gateway address. For example, the remote device can determine which gateway is being used, and if communication through the default gateway is lost, the remote device can use the back-up gateway for communication. According to such embodiments, while the back-up gateway is being used for communication, the remote device can attempt to communicate through the default gateway at predetermined intervals, such as every 10 minutes, until communication through the default gateway is successful. Such alternate embodiments can also help prevent non-proprietary remote devices on the same network from using the back-up gateway for communication.

Figure 6:
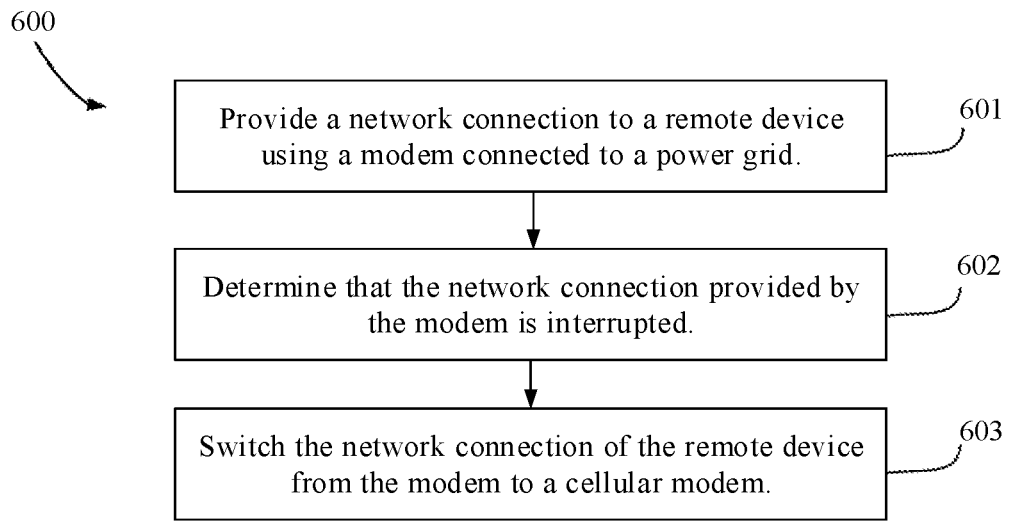
FIG. 6 is a flowchart of a method switching network connection according to an embodiment.

FIG. 6 shows a method for switching network connection in accordance with exemplary embodiments. The method may be applied in connection with a computing device. The computing device, for example, may be on device 10 in FIG. 1 and communicate with UPS 12, network switch 14, cellular modem 16, and battery & charger 18.

According to exemplary embodiments shown schematically in FIG. 6, in step 601, the computing device may provide a network connection to a remote device using a modem connected to a power grid. For example, the computing device may control the switch to provide the remote device with a network connection through the grid powered modem.

In step 602, the computing device may determine that the network connection provided by the modem is interrupted. For example, the computing device may monitor the UPS 12 and determine if there is an interruption in electrical power being supplied. In another example, the computing device may monitor the grid powered modem to determine if the modem is supplied power or turned on.

In step 603, the computing device may switch the network connection of the remote device from the modem to a cellular modem. For example, the computing device control the switch to change the connection between the remote device to the cellular modem.

FIG. 7 shows a computing environment 710 coupled with a user interface 760 and network interface 770 according to exemplary embodiments. The computing environment 710 may be part of a data processing server, mobile device, mobile terminal or handheld device. The computing environment 710 includes processor 720, graphical processing units 730, memory 740, and I/O interface 750.

According to exemplary embodiments shown schematically, in FIG. 7, the processor 720 can control overall operations of the computing environment 710, such as the operations associated with the display, data acquisition, data communications, and image processing. The processor 720 may include one or more processors to execute instructions to perform all or some of the steps in the above-described methods. Moreover, the processor 720 may include one or more modules that facilitate the interaction between the processor 720 and other components. The processor may be a Central Processing Unit (CPU), a microprocessor, a single chip machine, or the like.

Memory 740 can be configured to store various types of data to support the operation of the computing environment 710. Memory 740 may include predetermined software 741. Examples of such data comprise instructions for any applications or methods operated on the computing environment 710, video datasets, image data, etc. Memory 740 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

I/O interface 750 can provide an interface between the processor 720 and peripheral interface modules, such as a keyboard, a click wheel, buttons, a touch screen, and the like. The buttons may include but are not limited to, a home button, a start scan button, and a stop scan button. The I/O interface 750 can be coupled with an encoder and decoder.

Network Interface 770 can provide communication between the processing unit and an external device. The communication can be done through, for example, WIFI or BLUETOOTH hardware and protocols. The Network Interface 770 may communicate with a mobile network that connects to the internet and webservers.

User interface 760 may be a mobile terminal or a display.

In some embodiments, a non-transitory computer-readable storage medium can be provided comprising a plurality of programs, such as comprised in the memory 740, executable by the processor 720 in the computing environment 710, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium can have a plurality of programs stored therein for execution by a computing device having one or more processors, where the plurality of programs when executed by the one or more processors, cause the computing device to perform the above-described method for motion prediction.

According to exemplary embodiments, the computing environment 710 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

Remote devices, such as IoT devices or other critical devices like medical equipment, can require a consistent connection to a network or internet. This is true and even more critical when there are natural disasters like hurricanes or even floods or just power outages. Therefore, the device and methods for network switching provided herein allow for remote devices to have a consistent connection to a network or internet by switching to a cellular modem with a backup battery when there is a power outage.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

What is claimed is:

1. A device comprising:
   an uninterrupted power supply (UPS) configured to provide electrical power from a power grid to a battery and a modem;
   the battery configured to provide electrical power to a cellular modem;
   the cellular modem configured to provide a back-up network connection to a remote device, wherein the remote device comprises a fluid pump; and
   a network switch that determines that a default network connection provided to the fluid pump by the modem is interrupted, switches network connectivity to the back-up network connection and transmits an electronic reporting notification to a user electronic device through the cellular modem, the electronic reporting notification identifying the default network connection provided to the fluid pump by the modem as being interrupted.

2. The device of claim 1, wherein the battery comprises a charger and is kept charged by the UPS.

3. The device of claim 1, wherein the UPS provides electrical power to the remote device.

4. The device of claim 1, further comprising:
   a power over ethernet injector configured to provide electrical power to the remote device.

5. The device of claim 1, further comprising:
   a power detector configured to detect when the power grid is interrupted.

6. A method for switching network connection comprising:
   providing a default network connection to a remote device using a modem connected to a power grid, wherein the remote device comprises a fluid pump;
   determining that the default network connection provided by the modem is interrupted;
   establishing a back-up network connection between a cellular modem and the remote device:
   switching network connectivity of the remote device from the modem to the cellular modem through the back-up network connection; and reporting to a user electronic device through the cellular modem that the default network connection provided by the modem is interrupted.

7. The method of claim 6, wherein determining that the default network connection provided by the modem is interrupted comprises:
   determining that electrical power from the power grid is interrupted.

8. The method of claim 6, further comprising:
   providing electrical power to the cellular modem using a battery.

9. A computing device comprising:
   one or more processors; and
   a non-transitory computer-readable storage medium storing instructions executable by the one or more processors, wherein the one or more processors are configured to:
   provide a default network connection to a remote device using a modem connected to a power grid, wherein the remote device comprises a fluid pump;
   determine that the default network connection provided by the modem is interrupted;
   establish a back-up network connection between a cellular modem and the remote device:
   switch network connectivity of the remote device from the modem to the cellular modem through the back-up network connection; and
   report to a user electronic device through the cellular modem that the default network connection provided by the modem is interrupted.

10. The computing device of claim 9, wherein the one or more processors configured to determine that the default network connection provided by the modem is interrupted are further configured to:
    determine that electrical power from the power grid is interrupted.

11. The computing device of claim 9, wherein the one or more processors are further configured to:
    provide electrical power to the cellular modem using a battery.

12. The device of claim 1, wherein the network switch determines that the power grid is interrupted.

13. The device of claim 1, wherein the remote device comprises a sump pump.

14. The device of claim 1, wherein the network switch determines that communication through the modem is successful and switches network connectivity to the default network connection.

15. The device of claim 1, further comprising:
    power loss detection circuitry that continuously monitors a state of the UPS and transmits to the network switch a first electronic signal when electrical power is present and a second electronic signal when electrical power loss is detected, wherein the network switch determines an interruption in the default network connection based on the second electronic signal.

16. The method of claim 6, further comprising:
    determining that the power grid is interrupted; and
    transmitting an electronic reporting notification to a user electronic device through the cellular modem that the power grid is interrupted.

17. The method of claim 6, wherein determining that the default network connection provided by the modem is interrupted comprises:
    continuously monitoring a state of the UPS; and
    determining that electrical power loss is detected.

18. The method of claim 6, further comprising:
    determining that communication through the modem is successful; and
    switching the network connectivity to the default network connection.

19. The computing device of claim 9, wherein the one or more processors are further configured to:
    determine that the power grid is interrupted; and
    transmit an electronic reporting notification to a user electronic device through the cellular modem that the power grid is interrupted.

20. The computing device of claim 9, wherein the one or more processors are further configured to:
    determine that communication through the modem is successful; and
    switch the network connectivity to the default network connection.

* * * * *